UNITED STATES PATENT OFFICE.

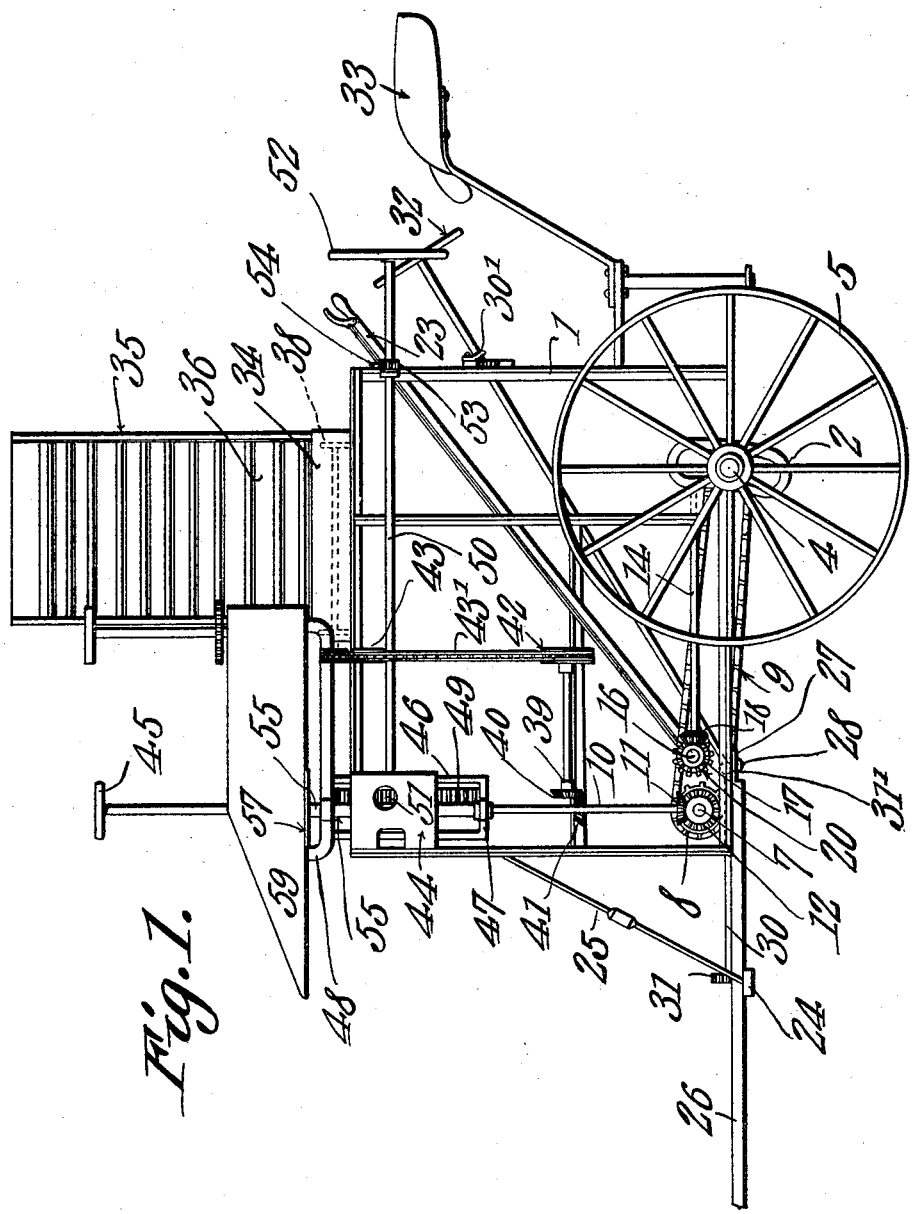

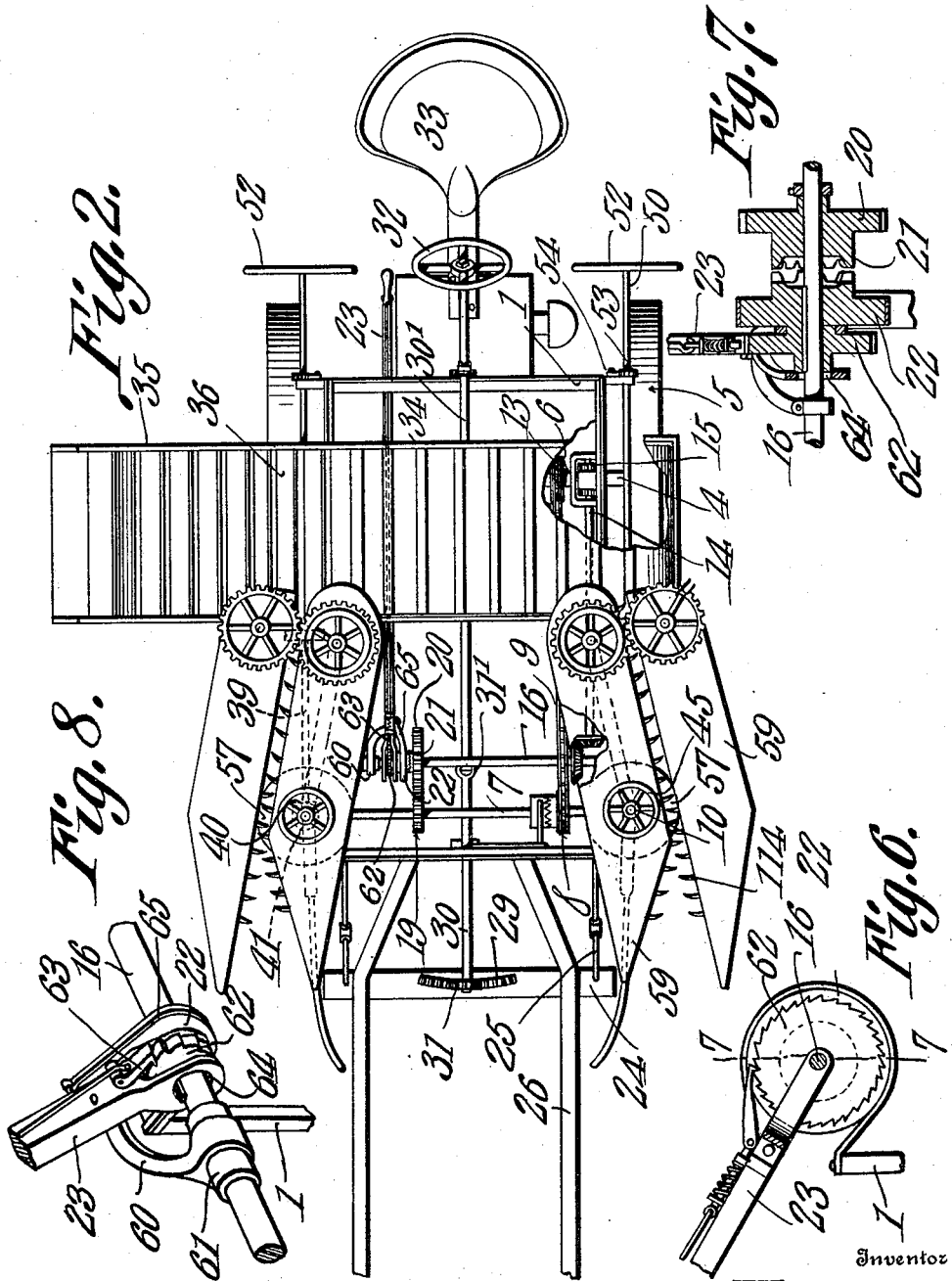

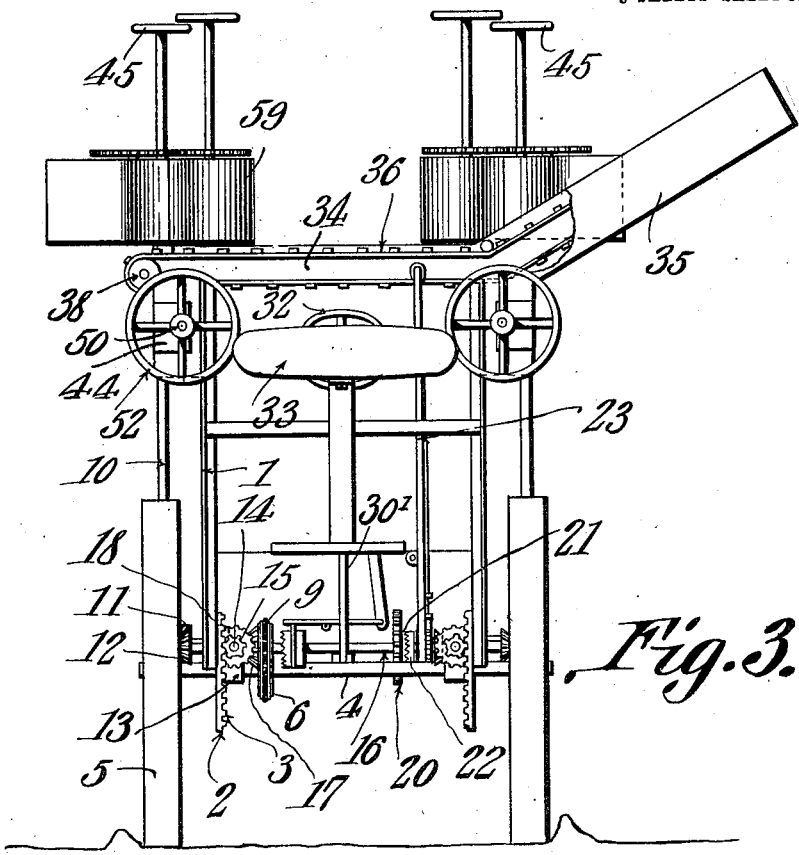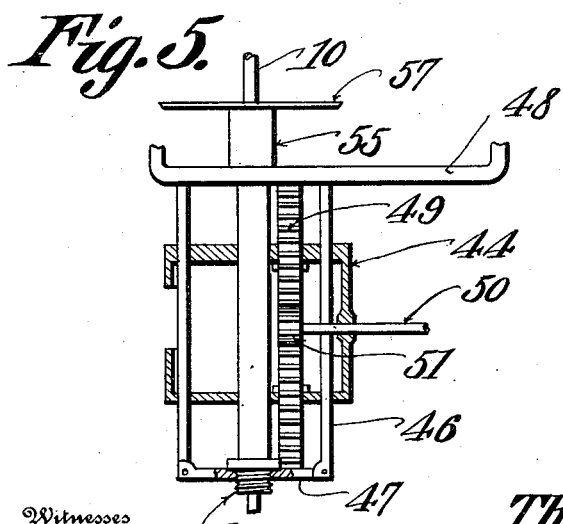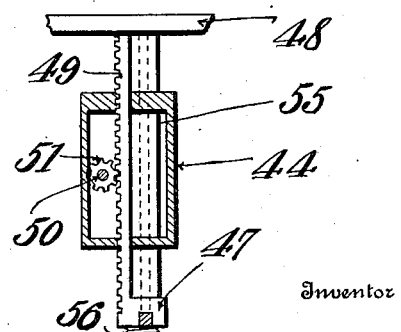

THEODORE J. HAMMONS, OF BRONSON, KANSAS.

FRAME FOR KAFIR-CORN HEADERS.

1,033,691. Specification of Letters Patent. Patented July 23, 1912.

Application filed February 21, 1910. Serial No. 545,226.

*To all whom it may concern:*

Be it known that I, THEODORE J. HAMMONS, a citizen of the United States, residing at Bronson, in the county of Bourbon and State of Kansas, have invented a new and useful Frame for Kafir-Corn Headers, of which the following is a specification.

This invention has relation to frames for Kafir corn headers and consists in the novel construction and arrangement of its parts as hereinafter described and claimed.

The object of the invention is to provide a header comprising a wheel supported frame with heading devices mounted thereon and operatively connected with the supporting wheels. Also means for raising the frame with relation to the wheels and means for operatively connecting the frame supporting wheels with the said frame raising means. Also to provide means for holding the frame in raised position, which last said means is adapted to be manipulated to permit the frame to gradually gravitate.

In the accompanying drawings,—Figure 1 is a side elevation of the Kafir corn header frame. Fig. 2 is a top plan view of the same. Fig. 3 is a rear end elevation of the same. Figs. 4 and 5 are detail sectional views of means adapted to be manually operated to raise or lower the headers proper of the machine. Figs. 6 and 7 are detail sectional views of clutch means for raising, holding and lowering the frame of the machine. Fig. 8 is a perspective view of part of the means adapted to be manipulated to permit the frame of the machine to gravitate.

The header comprises a frame 1 having at its sides and in the vicinity of its rear end arcuate guides 2 which are provided with gear teeth 3. An axle 4 projecting at its end portions through the openings in the guides 2 and traction wheels 5 are fixed to the ends of the said axle. A sprocket wheel 6 is fixed at the intermediate portion of the said axle. A shaft 7 is journaled for rotation at the forward portion of the frame 1 and a sprocket wheel 8 is loosely mounted on the said shaft 7. A sprocket chain 9 passes around the sprocket wheels 6 and 8 and is adapted to transmit rotary movement from the axle 4 to the wheel 8.

Vertically disposed shafts 10 are journaled for rotation at the sides of the frame 1 and are provided at their lower ends with fixed pinions 11 which mesh with pinions 12 fixed to the ends of the shaft 7. Bearings 13 are mounted on the end portions of the axle 4 adjacent the guides 2 and the rear end portions of shafts 14 are journaled in the said bearings 13. Pinions 15 are fixed to the rear end portions of the shafts 14 and mesh with the gear rack 3 carried by the guides 2. A countershaft 16 is journaled for rotation at the forward portion of the frame 1 and is provided at its ends with fixed pinions 17 which mesh with the pinions 18 fixed to the forward ends of the shafts 14. A gear wheel 19 is fixed to the shaft 7 and meshes with a gear wheel 20 journaled upon the shaft 16. The wheel 20 is provided with a clutch hub 21 and a clutch member 22 is slidably mounted upon the shaft 16 adjacent the said wheel 20. A lever 23 is fulcrumed upon the shaft 16 and is connected with the clutch member 22 for operating the same as will be presently described. By this arrangement of parts it will be observed that as the wheels 5 rotate rotary movement is transmitted from the axle 4 to the shaft 7 and from the shaft 7 to the vertically disposed shafts 10. At the same time when it is desired to raise or lower the frame 1 with relation to the centers of the wheels 5, the lever 23 may be swung so as to cause the clutch member 22 to engage the clutch hub 21 of the wheel 20. Thus the shaft 16 is caused to rotate with the shaft 7 and through the intermeshing pinions 17 and 18 rotary movement is transmitted to the shafts 14 and by reason of the fact that the wheels 15 are in mesh with the gear teeth 3 upon the guides 2 the said guides 2 and frame 1 will be raised with relation to the axle 4. The lever 23 is provided with means hereinafter described for holding the frame in raised position and means which may be manipulated to gradually lower the machine.

At the forward portion of the frame 1 is located a guide 24 which is held by means of supports 25. Shafts 26 pass over the guide 24 at their rear portions and are provided with a bearing 27 which receives a bolt 28 attached to the frame 1. A gear rack 29 is fixed to a cross bar connected at its ends with the shafts 26 and which lies over the guide 24. The shaft 30 is journaled upon the frame 1 and is provided at its forward end with a beveled pinion 31 which meshes with the gear rack 29. A shaft 30' is also journaled upon the frame 1 and is connected with the shaft 30 by means of a universal joint 31'. A hand wheel 32 is fixed to the rear end of the shaft 30' and is located within convenient reach of one occupying the seat 33 mounted upon the frame 1. It is obvious that by rotating the shaft 30 that the gear rack 29 will be moved longitudinally under the pinion 31 and the frame 1 may be pitched at different angles with relation to the shafts 26. The object of this adjustment is that the said frame 1 may be accurately guided in its course as it is drawn along the rows of standing corn. A conveyer trunk 34 is mounted upon the frame 1 and is provided with an inclined end portion 35 and a conveyer belt 36 is mounted for orbital movement along the trunk 34 and passes over the wheels or rollers 38. A shaft 39 is journaled for rotation upon the frame 1 and at one end is provided with a beveled pinion 40 which meshes with a beveled pinion 41 fixed to one of the shafts 10. A sprocket wheel 42 is fixed to the other end of the shaft 39 and a sprocket wheel 43 is fixed to the axis of one of the wheels 38. A chain 43' passes around the wheels 42 and 43. Thus means is provided for transmitting movement from one of the vertical shafts to the conveyer belt. Guides 44 are fixed to the upper forward portions of the frame 1 and at the opposite sides thereof and receive the intermediate portions of the vertically disposed shafts 10 heretofore described. Fly wheels 45 are fixed to the upper ends of the said shafts 10. Vertically disposed bars 46 are slidably mounted in the guides 44 and are joined at the lower ends with plates 47 which also receive the intermediate portions of the shafts 10. Brackets 48 are located at the upper ends of the bars 46 and rack bars 49 are connected at their upper ends with the brackets 48 and at their lower ends with the plates 47. Shafts 50 are journaled at their forward ends in the guides 44 and are provided with pinions 51 which mesh with the rack bars 49. Hand wheels 52 are fixed to the rear ends of the shafts 50 and are located within convenient reach of one occupying the seat 33. Ratchet wheels 53 are fixed to the shafts 50 and pawls 54 are pivotally mounted upon the frame 1 and are adapted to engage the ratchet wheels 53. By this arrangement it will be seen that by rotating the shafts 50 through the instrumentality of the hand wheels 52 and by reason of the gear wheels 51 intermeshing with the rack bars 49, the brackets 48 may be raised or lowered as desired. The said brackets at the opposite sides of the machine may be raised or lowered at the same time or at different times. Sleeves 55 are slidably mounted upon the intermediate portions of the shafts 10 but are provided with non-circular openings which snugly receive the intermediate portions of the said shafts which portions are also non-circular and consequently the said sleeves 55 are obliged to rotate in unison with the said shafts. Thimbles 56 are screw threaded in the plates 47 and also receive the shafts 10. The openings through the thimbles however are of sufficient diameter to permit the said shafts to rotate independently of the said thimbles. The lower ends of the sleeves 55 rest upon the upper ends of the thimbles 56 and cutting disks 57 are fixed to the upper ends of the said sleeves. Consequently as the said disks become displaced as a consequence of wear it is obvious that by adjusting the thimbles 56 that the sleeves 55 may be moved longitudinally whereby the said disks 57 may be adjusted to proper position. Each of the brackets 48 supports a heading apparatus 59 and consequently such an apparatus is located at each side of the frame 1. As the structure of these heading devices forms no part of the present invention, further allusion to the same in the specification is deemed unnecessary.

The mounting and operation of the lever 23 which together with its coöperating parts is the means adapted to be manipulated to permit the frame 1 to gradually gravitate, will be described. An arm 60 is mounted upon the shaft 16 but does not rotate with the said shaft. The said arm is held against movement longitudinally of the shaft by any suitable means, such for instance as collars 61 most clearly shown in Fig. 8. The lever 23 is fulcrumed at its lower end upon the arm 60. The lever 23 is provided at its lower end with a bifurcation which receives a ratchet disk 62 which forms a part of the clutch member 22. The clutch member 22 is splined upon the shaft 16 and consequently is constrained to cause the shaft to rotate with the same but may move longitudinally along the shaft. A pawl 63 is pivoted at the lower end of the lever 23 and lies at its free end upon the upper portion of the ratchet disk 62. The lower end portions of the lever 23 are provided with openings 64 which loosely surround the shaft 16 and the intermediate portion of the clutch member 22. A friction band 65 is secured at one end to a stationary part of the frame 1 and is trained around the periphery of the clutch member 22 and at its other end is secured to the lever 23 at a point to one side of the shaft 16. Therefore it will be seen that when the lever 23 is swung from one side to the other the clutch member 22 will be moved toward or away from the clutch member 21. After the frame 1 has been raised by the clutch member 22 being in engagement with the clutch member 21 an operator may grasp the power end of the lever 23 and swing the same down about the axis of the shaft 16. Thus the friction band 65 is drawn tight against the periphery of the clutch member 22 and the lever 23 is then swung so that the clutch member 22 is disengaged from the clutch member 21. By continuing to bear down upon the power end of the lever 23 the shaft 16 will be held against rotation and thus the frame 1 will be held in an elevated position with relation to the supporting wheels 5. By gradually releasing the downward pressure upon the power end of the lever 23 and by raising the pawl 63 the clutch member 22 may be permitted to slip within the friction band 65 and thus the shaft 16 may turn in the direction opposite to that in which it is turned when the frame is raised and the weight of the frame 1 will cause the same to descend with relation to the wheels 5 and the racks 3 will rotate the wheels 15 and shafts 14 which in turn through the intermeshing gear wheels 17 and 18 will rotate the shaft 16. Thus the frame of the machine may be permitted to gradually gravitate.

Having described my invention, what I claim as new and desire to secure by Letters Patent is:—

1. A header comprising a frame, an axle, traction wheels secured to the axle, a shaft journaled in the frame and operatively connected to the axle, a heading device mounted upon the frame and operatively connected to the said shaft, a counter shaft journaled in the frame and operatively connected to the frame to raise and lower the frame, a gear wheel fixed to the former shaft, a gear wheel meshing therewith and journaled upon the counter shaft, the latter gear wheel being provided with a clutch hub, a clutch member slidably mounted upon the counter shaft, means for sliding the clutch member to engage and disengage the clutch hub, and means for frictionally holding the clutch hub when the slidable clutch member is disengaged therefrom.

2. A header comprising a frame having arcuate guides at its rear end carrying gear racks, an axle projecting at its end portions through the openings in the guides, traction wheels fixed to the ends of the axle, a shaft journaled for rotation at the forward portion of the frame which is operatively connected to the axle, a heading device mounted upon the frame and operatively connected to the said shaft, bearings mounted on the end portions of the axle adjacent the aforesaid guides, shafts journaled at the rear ends in the said bearings, pinions fixed to the rear end portions of the said shafts meshing with the gear racks, a counter shaft mounted for rotation at the forward end of the frame and operatively connected to the latter shafts, a gear wheel fixed to the former shaft, a gear wheel meshing therewith journaled upon the counter shaft, the latter gear wheel provided with a clutch hub, a clutch member slidably mounted upon the counter shaft, means for sliding the clutch member to engage and disengage the clutch hub and means for frictionally holding the clutch hub when the slidable clutch member is disengaged therefrom, whereby the frame can be gravitated when the clutch member is disengaged from the clutch hub.

3. A header comprising a frame having gear racks, an axle, traction wheels secured to the axle, a shaft journaled in the frame and operatively connected to the axle, a heading device mounted upon the frame and operatively connected to the said shaft, a counter shaft journaled in the frame, shafts operatively connected to the counter shaft, pinions on the last mentioned shafts meshing with the gear racks, a gear wheel fixed to the former shaft, a gear wheel meshing therewith journaled upon the counter shaft, the latter gear wheel being provided with a clutch hub, a clutch member slidably mounted upon the counter shaft, means for sliding the clutch member to engage and disengage the hub, and means for frictionally holding the clutch hub when the slidable clutch member is disengaged therefrom.

In testimony that I claim the foregoing as my own, I have hereto affixed my signature in the presence of two witnesses.

THEODORE J. HAMMONS.

Witnesses:
WM. CAMPBELL,
F. L. ORBISON.

---

Copies of this patent may be obtained for five cents each, by addressing the "Commissioner of Patents, Washington, D. C."